United States Patent
Chapman et al.

(10) Patent No.: US 10,683,190 B2
(45) Date of Patent: Jun. 16, 2020

(54) INTELLIGENT BUILDING SYSTEM FOR IMPLEMENTING ACTIONS BASED ON USER DEVICE DETECTION

(71) Applicant: Otis Elevator Company, Farmington, CT (US)

(72) Inventors: Ashley Chapman, Plainville, CT (US); Bradley Armand Scoville, Farmington, CT (US); Paul A. Simcik, Southington, CT (US); Eric C. Peterson, East Longmeadow, MA (US); Donald F. Cominelli, Berlin (DE); Hans-Kilian Spielbauer, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 314 days.

(21) Appl. No.: 15/533,619

(22) PCT Filed: Dec. 15, 2015

(86) PCT No.: PCT/US2015/065735
§ 371 (c)(1),
(2) Date: Jun. 6, 2017

(87) PCT Pub. No.: WO2016/100293
PCT Pub. Date: Jun. 23, 2016

(65) Prior Publication Data
US 2017/0349402 A1 Dec. 7, 2017

Related U.S. Application Data

(60) Provisional application No. 62/091,858, filed on Dec. 15, 2014.

(51) Int. Cl.
*B66B 1/34* (2006.01)
*B66B 1/46* (2006.01)
(Continued)

(52) U.S. Cl.
CPC ............ *B66B 1/468* (2013.01); *B66B 1/3461* (2013.01); *B66B 1/3492* (2013.01);
(Continued)

(58) Field of Classification Search
CPC ..... B66B 1/468; B66B 1/3461; B66B 1/3492; B66B 5/0012; B66B 2201/4615;
(Continued)

(56) References Cited

U.S. PATENT DOCUMENTS

| 5,952,626 A | * | 9/1999 | Zaharia | B66B 1/468 187/381 |
| 6,109,396 A | * | 8/2000 | Sirag | B66B 1/468 187/381 |

(Continued)

FOREIGN PATENT DOCUMENTS

| CN | 102762476 A | 10/2012 |
| EP | 1764334 A1 | 3/2007 |

(Continued)

OTHER PUBLICATIONS

International Search Report and Written Opinion for PCT Application No. PCT/US2015/065735, dated Mar. 31, 2016, pp. 1-11.
(Continued)

*Primary Examiner* — Anthony J Salata
(74) *Attorney, Agent, or Firm* — Cantor Colburn LLP

(57) ABSTRACT

A system and/or method that establishes a proximity environment with respect to an elevator and detecting a position of a user device within the proximity environment is provided. Further the system and method determines a source floor and a destination floor respective to the user device and generating an elevator call to the elevator in accordance with the source floor and the destination floor.

13 Claims, 5 Drawing Sheets

(51) Int. Cl.
*G06Q 50/30* (2012.01)
*G06Q 10/02* (2012.01)
*B66B 5/00* (2006.01)
*H04W 4/021* (2018.01)
*H04W 4/02* (2018.01)
*G07C 9/00* (2020.01)

(52) U.S. Cl.
CPC ........... *B66B 5/0012* (2013.01); *G06Q 10/02* (2013.01); *G06Q 50/30* (2013.01); *H04W 4/021* (2013.01); *H04W 4/023* (2013.01); *B66B 2201/4615* (2013.01); *B66B 2201/4638* (2013.01); *B66B 2201/4653* (2013.01); *G07C 9/00111* (2013.01)

(58) Field of Classification Search
CPC .... B66B 2201/4653; B66B 2201/4638; G06Q 10/02; G06Q 50/30; H04W 4/021; H04W 4/023; G07C 9/00111
USPC ........ 187/247, 380–389, 391, 392, 393, 396
See application file for complete search history.

(56) References Cited

U.S. PATENT DOCUMENTS

| | | | |
|---|---|---|---|
| 6,202,799 B1* | 3/2001 | Drop | B66B 1/2408 187/388 |
| 6,209,685 B1* | 4/2001 | Zaharia | B66B 1/468 187/381 |
| 6,382,363 B1* | 5/2002 | Friedli | B66B 1/468 187/384 |
| 6,868,945 B2* | 3/2005 | Schuster | B66B 1/468 187/380 |
| 6,984,945 B2* | 1/2006 | Sato | G03F 7/70758 318/135 |
| 7,552,800 B2* | 6/2009 | Puskala | B66B 1/468 187/384 |
| 7,823,700 B2 | 11/2010 | Boss et al. | |
| 8,020,672 B2* | 9/2011 | Lin | B66B 1/34 187/316 |
| 8,061,485 B2* | 11/2011 | Finschi | B66B 1/468 187/384 |
| 8,348,021 B2 | 1/2013 | Finschi | |
| 8,396,485 B2 | 3/2013 | Grainger et al. | |
| 8,401,472 B2 | 3/2013 | Gerstenkorn | |
| 8,910,752 B2* | 12/2014 | Furutani | B66B 1/468 187/384 |
| 8,960,373 B2* | 2/2015 | De Vincentis | B66B 1/2408 187/381 |
| 9,323,232 B2* | 4/2016 | Blom | H04W 4/029 |
| 2008/0218405 A1 | 9/2008 | Eckhart | |
| 2008/0236956 A1 | 10/2008 | Finschi | |
| 2011/0278096 A1 | 11/2011 | Kentenich et al. | |
| 2012/0000733 A1 | 1/2012 | Finschi | |
| 2012/0305340 A1 | 12/2012 | Wu | |
| 2013/0153339 A1 | 6/2013 | Sarjanen | |
| 2013/0245832 A1 | 9/2013 | Blom et al. | |
| 2014/0248910 A1 | 9/2014 | Dave et al. | |

FOREIGN PATENT DOCUMENTS

| | | |
|---|---|---|
| EP | 2704105 A1 | 3/2014 |
| JP | 2013151361 A | 8/2013 |
| WO | 2012093985 A1 | 7/2012 |
| WO | 2013076080 A1 | 5/2013 |
| WO | 2014049201 A1 | 4/2014 |
| WO | 2014076369 A1 | 5/2014 |
| WO | 2014113882 A1 | 7/2014 |
| WO | 2014130145 A1 | 8/2014 |

OTHER PUBLICATIONS

Chinese Office Action for application CN 201580068508.8, dated Feb. 26, 2020, 8 pages.

* cited by examiner

INTELLIGENT BUILDING SYSTEM FOR IMPLEMENTING ACTIONS BASED ON USER DEVICE DETECTION

CROSS REFERENCE TO RELATED APPLICATIONS

This is a US National Stage of Application No. PCT/US2015/065735 filed on Dec. 15, 2015, which claims the benefit of priority to U.S. Provisional Application No. 62/091,858 filed Dec. 15, 2014, the disclosures of which are incorporated herein by reference in their entirety.

BACKGROUND

The disclosure relates generally to an intelligent building system for implementing operations based on user device detection. More specifically, the disclosure relates generally to an intelligent building system that utilizes geo-fence thresholds and elevator bank locations to detect a user device and implements operations based on actions and/or movements of the user device with respect to the geo-fence thresholds and the elevator bank locations.

Existing building systems, such as an elevator system, require a user to physically interact with the system. For example, a user of an elevator may enter an elevator call by pressing a button (e.g., a hall call) or entering a destination (e.g., a destination call). Such systems do not arrange service for the user until the user is physically present at an elevator input. Systems that identify a user's location and arrange service for the user in advance would be well-received in the art.

SUMMARY

According to one embodiment of the present invention, a method comprises establishing a proximity environment with respect to an elevator; detecting a position of a user device within the proximity environment; determining, by a processor, a source floor and a destination floor respective to the user device; and generating, by the processor, an elevator call to the elevator in accordance with the source floor and the destination floor.

In another embodiment or in the above embodiment, the determining of the source floor and the destination floor of the method may also comprise accessing user preferences that correspond to the user device, the user preferences indicating the source floor and the destination floor.

In another embodiment or in any of the above embodiments, the determining of the source floor and the destination floor of the method may also comprise processing a pre-request received in advance of the user device penetrating the proximity environment.

In another embodiment or in any of the above embodiments, the proximity environment can be a plurality of virtual perimeters.

In another embodiment or in any of the above embodiments, each virtual perimeter can be dynamically generated around a predefined set of boundaries with respect to the elevator.

In another embodiment or in any of the above embodiments, the generating of the elevator call to the elevator of the method may also comprise generating the elevator call to the elevator upon a detection by the proximity system of the user device within a predetermined distance to the elevator.

In another embodiment or in any of the above embodiments, the method may also comprise communicating the elevator call to the user device.

In another embodiment or in any of the above embodiments, the generating of the elevator call to the elevator of the method may also comprise determining an arrival time for the user device at the elevator in response to motion of the mobile device.

Another embodiment or any of the above embodiments may be implemented in a system that comprises a processor and a memory, where the processor configured to establish a proximity environment with respect to an elevator; detect a position of a user device within the proximity environment; determine a source floor and a destination floor respective to the user device; and generate an elevator call to the elevator in accordance with the source floor and the destination floor.

In another embodiment or in any of the above embodiments, with respect to the determination of the source floor and the destination floor, the processor can be further configured to access user preferences that correspond to the user device, wherein the user preferences indicate the source floor and the destination floor.

In another embodiment or in any of the above embodiments, with respect to the determination of the source floor and the destination floor, the processor can be further configured to process a pre-request received in advance of the user device penetrating proximity environment.

In another embodiment or in any of the above embodiments, the proximity environment can be a plurality of virtual perimeters.

In another embodiment or in any of the above embodiments, each virtual perimeter can be dynamically generated around a predefined set of boundaries with respect to the elevator.

In another embodiment or in any of the above embodiments, with respect to the generation of the elevator call to the elevator, the processor can be further configured to generate the elevator call to the elevator upon a detection by a proximity system of the user device within a predetermined distance to the elevator.

In another embodiment or in any of the above embodiments, with respect to the generation of the elevator call to the elevator, the processor is further configured to determine an arrival time for the user device at the elevator in response to motion of the mobile device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
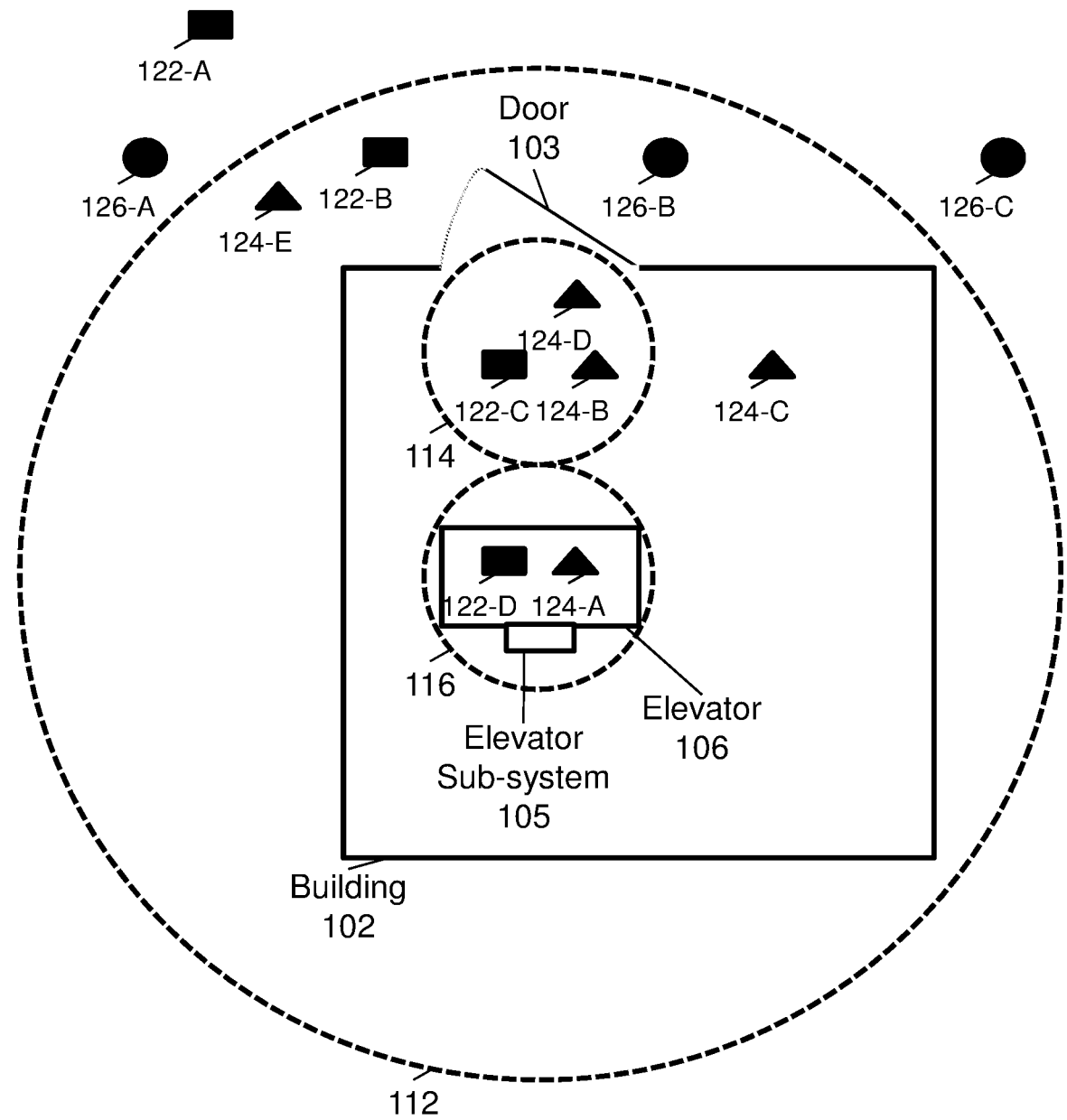
FIG. 1 illustrates an example of a schematic of an intelligent building system according to one embodiment.

Embodiments relate to an intelligent building system, which based on actions and/or movements of a user device with respect to an elevator sub-system (e.g., geo-fence thresholds and elevator bank locations) of that intelligent building system, implements operations that assist a user of the user device.

In general, embodiments of the present invention disclosed herein may include an intelligent building system, method, and/or computer program product (herein "intelligent building system") that utilizes an elevator, elevator lobby, and/or elevator bank to establish a proximity zone and/or geo-fence, such that when a user device associates with an elevator sub-system of the intelligent building system, the intelligent building system may implement operations and/or send signals to other systems and sub-systems that assist a user of the user device. Examples of other systems and subsystems may include parking facilities, security systems, home automation systems, car service systems, travel indication systems, etc. Examples of operations and/or signals may include generating an elevator call, triggering a parking payment, sending a valet retrieval request, enabling or disabling a security alarm, enabling or disabling lights in a home, enabling or disabling a home appliance, sending a cab or car service request, notifying an airline system, providing a notification to the user, etc. intelligent building system and elements therein may take many different forms and include multiple and/or alternate components and facilities. Note that negative triggers are also possible, e.g. cancelling an elevator call if a user leaves the proximity of an elevator landing before the elevator arrives, or if a user fails to progress towards the objective as originally computed.

For example, the intelligent building system may include an elevator sub-system that comprises electromechanical arrangements (e.g., a controller and/or computing device that communicates with at least one motor) that control speed, position, and door operation of an elevator or bank of elevators. The controller of the elevator sub-system may generate and monitor (or communicate with other systems and sub-systems through any network communication technologies that can generate and monitor) a proximity and/or geo-fence environment, such that the elevator sub-system may operate the elevator or bank of elevators as a user device interacts with the geo-fence environment. The elevator sub-system may also communicate directly to and/or utilize a proximity system to communicate with user devices.

A proximity and/or geo-fence environment is a plurality of geo-fences, each of which is a virtual perimeter that can be dynamically generated around a geographic location and/or be a predefined set of boundaries, as in a radius around an elevator, elevator lobby, and/or elevator bank or as in property and municipal boundaries. Geo-fences can be generated and monitored by any detection, communication, and/or location technology, such as global positioning systems ("GPS"), radio frequency identification ("RFID"), near field communication ("NFC"), short wave radio, proximity systems, Bluetooth Low Energy (BLE) beacons, etc.

Referring now to FIG. 1, an example schematic of an intelligent building system 100 is shown. The intelligent building system 100 is only one example of an intelligent building system and is not intended to suggest any limitation as to the scope of use or operability of embodiments of the invention described herein (indeed additional or alternative components and/or implementations may be used). The intelligent building system 100 includes a building 102, a door 103, an elevator sub-system 105, an elevator 106, and a proximity and/or geo-fence environment ("geo-fence environment") that includes geo-fences 112, 114, 116. Further, the intelligent building system 100 illustrates a plurality of user devices 122, 124, 126, each of which are shown at multiple different positions within the intelligent building system 100 as indicated by the capital letters A-E. In turn, when one of the user devices 122, 124, 126 enters or exits any one of the geo-fences 112, 114, 116, the intelligent building system 100 and/or the user devices 122, 124, 126 can reactively perform operations.

User devices 122, 124, 126 may be implemented using devices having short and/or long range communication and location services (e.g., mobile phone with GPS enabled). User may be individually identified based on one or more identifiers stored in the user devices 122, 124, 126. The user devices 122, 124, 126 can provide information, such as a destination, a preferred floor, a target floor, a device position, device movements, a source floor, and/or other preferences and data, which may also be received and stored in the elevator sub-system 105. In this way, this information is utilized by the intelligent building system 100 to enhance and improve indoor wayfinding. Note that the roles of the elevator sub-system 105 and the geo-fence environment may include the plurality of user devices 122, 124, 126 detecting and processing broadcasted signals by the elevator sub-system 105 and/or the geo-fence environment. In turn, the one or more of the plurality of user devices 122, 124, 126 can issue commands to the elevator sub-system 105 (e.g., commands that originates from the user devices 122, 124, 126).

For example, if a GPS that is in communication with the elevator sub-system 106 detects that the first user device 122 has crossed the geo-fence 112 by moving from position A to position B, the elevator sub-system 105 may automatically call the elevator 106 or perform an elevator call to a lobby of the building 102 so that, after a first user who is carrying the first user device 122 has walked through the door 103 to position C, the elevator 106 is waiting for the user. In this way the GPS is a "personal locator" that reports a position to the elevator sub-system. The first user may, thus, proceed to position D without any delay caused by waiting for the elevator.

Thus, the proximity and/or geo-fence environment may be implemented relative to an elevator lobby to identify user devices and source floors for those devices, such that the identity of the user devices and the source floors are utilized to calculate a destination floor and/or a common destination for multiple users to output a fastest elevator route. In this way, the intelligent building system 100 may detect when multiple users entered the geo-fence environment and calculate the most efficient mode for sending all users to their respective floors based on different groups and different floors. Further, when preferences associated with the identity of the user devices do not accurately reflect destination of a user, an override may be presented to the user, so that the user can instruct the intelligent building system 100 as to where they want to go through the user device. Preferences and/or the user information can be sourced from the devices or stored on the intelligent building system 100 so that destination information, such as a location of the meeting, and can be utilized to determine the destination. Preferences may also be set in advance by the user as further described below.

In another example, if a proximity sub-system that is connected to the elevator sub-system 105 detects that the second user device 124 is within the geo-fence 114 by moving from position A to position B (e.g., the user has exited the elevator 106), the elevator sub-system 105 may automatically trigger a notification or prompt on the second user device 124 that verifies whether a second user is leaving the building 102. If the second user indicates that they are not leaving the building and/or the elevator sub-system 105 detects the second user device 124 has moved from position B to position C (e.g., to speak with a front desk attendant), the elevator sub-system 105 can take no action. However, if the elevator sub-system 105 detects that the second user device 124 has moved from position C to position D and then from position D through the door 103 to position E or directly from positions B, D, and E (e.g., to leave the building 104), the elevator sub-system 105 may, thus, communicate and activate with a security system of a condominium that is in the building 102 without the second user having to directly activate the security system.

In another example, if the GPS that is in communication with the elevator sub-system 105 detects that the third user device 126 has entered and exited the geo-fence 114 by moving from position A through position B to position C, the elevator sub-system 105 may remain passive as a third user may not have a need to interact with the intelligent building system 100. In this way, GPS devices are only self-aware; any recognition of a third user's entry would be via cooperative reporting of user's portable GPS devices to a central node or the elevator sub-system 105.

In another example, the roles of the elevator sub-system 105 and the geo-fence environment may be reversed with the plurality of user devices 122, 124, 126 in that beacons of the geo-fence environment can broadcasts a signal that is detected and processed by one or more of the plurality of user devices 122, 124, 126. The one or more of the plurality of user devices 122, 124, 126 then issue commands to the elevator sub-system 105 (e.g., commands that originates from the user device). Further, while the proximity and/or geo-fence environment can aid in indoor way-finding, the direct communication between the plurality of user devices 122, 124, 126 and the elevator sub-system 105 can enable embodiments without the proximity and/or geo-fence environment, such that the elevator 106 itself can notify users of vertical position change.

Figure 2:
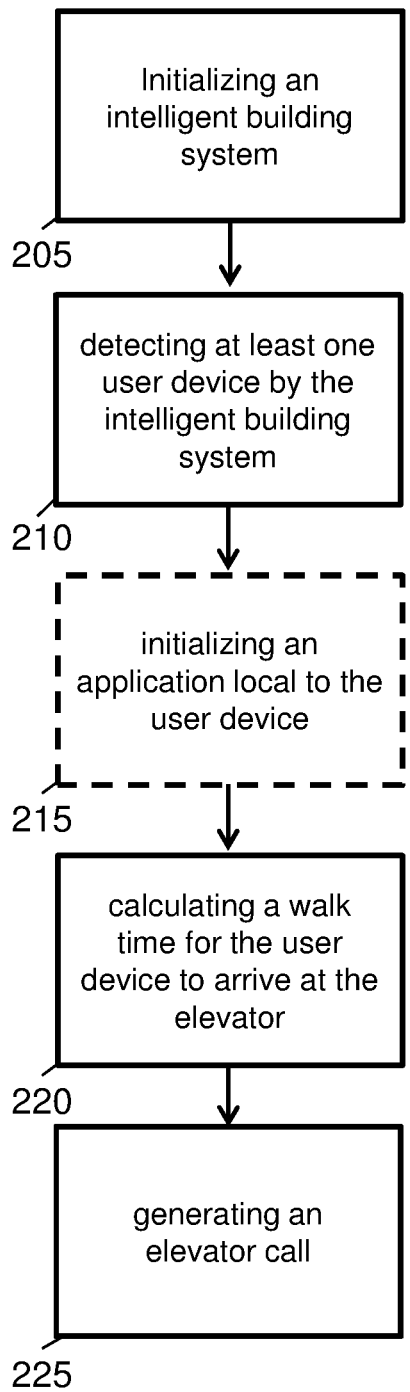
FIG. 2 illustrates a process flow by an intelligent building system according to one embodiment.

An example of a set of operations by the intelligent building system will be described with reference to FIG. 2. FIG. 2 illustrates a process flow 200. Process flow 200 begins at start block 205 where the intelligent building system 100 is initialized for detecting user devices (e.g., 122, 124, and 126). In this way, the intelligent building system 100 is ready to process operations in response to device actions and/or movements with respect to geo-fence thresholds and elevator bank locations of the intelligent building system 100.

Then, at block 210, at least one user device of at least one potential elevator rider is detected within the geo-fence environment (e.g., the user device 122 moves from position A to position B and crosses the geo-fence 112). Next, at block 215, an application localized on the user device 122 can be launched and initialized. This initialization facilitates connecting the potential elevator rider to the intelligent building system 100 ahead of time so that interaction with the elevator sub-system 105 is immediate and the potential elevator rider will not wait on other communication technology connections. From the perspective of the intelligent building system 100, the application is optionally launched and initialized as indicated by the block 210 being dashed.

Then, at block 220, the intelligent building system 100 calculates a walk time from position B to a front of the elevator 106. That is, the walk time can be calculated once the user enters the geo-fence 112 and coupled with other sensor data. Further, the walk time can be calculated as relative to the rate that the user device 112 penetrates each geo-fence 122, 114, 116. Other sensor data, such as user device accelerometer information, may be provided or received by to the intelligent building system 100 from the application localized on the user device 122 to support walking speed estimations by the intelligent building system 100 that render a more accurate walk time. Note that, since the intelligent building system 100 has detected the potential elevator rider as walking to the elevator 106, the identity of the user as the potential elevator passenger changes to an assumed/confirmed elevator passenger.

The process flow 200 next proceeds to block 225 where the elevator sub-system 105 generates a call the elevator 106. For example, the intelligent building system 100 utilizes the detection of the user device 122 from block 210 and the walk time calculation from block 220 to determine when the elevator user will arrive at the elevator 106 and initiates a request to use the elevator 106 on the users behalf, without the need for the elevator user to interact with the user device 122. Note that based on the user entering the first geo-fence 112, the intelligent building system 100 determines that the elevator user is approaching the elevator 106 from a particular source floor (e.g., via predetermined setting that indicates which floor or in what location of the building 102 the first geo-fence 112 is installed), and the intelligent building system 100 can also access a preferred floor and/or other elevator preferences. The user's preferred floor and/or other elevator preferences may be stored in elevator sub-system 105 or stored on the user's device 122. The user may be individually identified based on one or more identifiers stored in the user device. In this way, this information (e.g., user position, movements, source floor, destination floor, etc.) is useful to the intelligent building system 100 to reduce the number of nuisance calls and improve elevator performance calls. Note that users being individually identified only refers to the elevator control system; the user's actual personal identity may remain anonymous.

As another example, as the elevator user approaches the elevator 106 (e.g., an elevator bank), the intelligent building system 100 detects through a proximity system an approach of the user device 122 towards the elevator 106. A proximity system may be any location or distance detection system, an example of which includes a plurality of beacons that communicate through any radio, optical, ultrasonic, or other technology to determine a position, direction, and speed of a device in a room. In exemplary embodiments, the beacons use Bluetooth low energy (BLE) technology to detect the presence of a user device and interact with the user device 122.

As another example, users of the user devices 122, 124, 126 can enter elevator calls (e.g., provide destination floor information) in advance at their convenience while the users are not in the vicinity of the building 102, for example, while at home, riding the subway, or standing in line at the Deli. If a valid GPS signal and cell phone network is available for those user devices 122, 124, 126, the distance to the elevator 106 is measured. Then, if the distance is larger than a defined limit, the call request is automatically defined as a pre-request. The pre-request contains both source and destination floors and can be sent immediately to the elevator sub-system 105 via the cell phone network. The elevator sub-system 105 can set the pre-request as a user preference, check if the call is valid (e.g., user has access to the requested floor), and/or respond with immediate feedback to the users. The elevator sub-system 105 remembers or stores the pre-request call, and later automatically reenters this call in the form of a true call request when the corresponding user device is proximate to the elevator 106 (e.g., within the geo-fence environment). The elevator sub-system 105 then dispatches the elevator 106 to meet the user upon their arrival at the elevator 106, and enters their target call automatically. In this way, the passenger does not have to fumble with their telephone while approaching the building. If the valid GPS signal is not available, the call requests can be automatically stored as the pre-request within the user devices 122, 124, 126. Then, when the corresponding user device is proximate to the elevator 106 (e.g., within the geo-fence environment), the pre-request call can be entered as a true call request.

Figure 3:
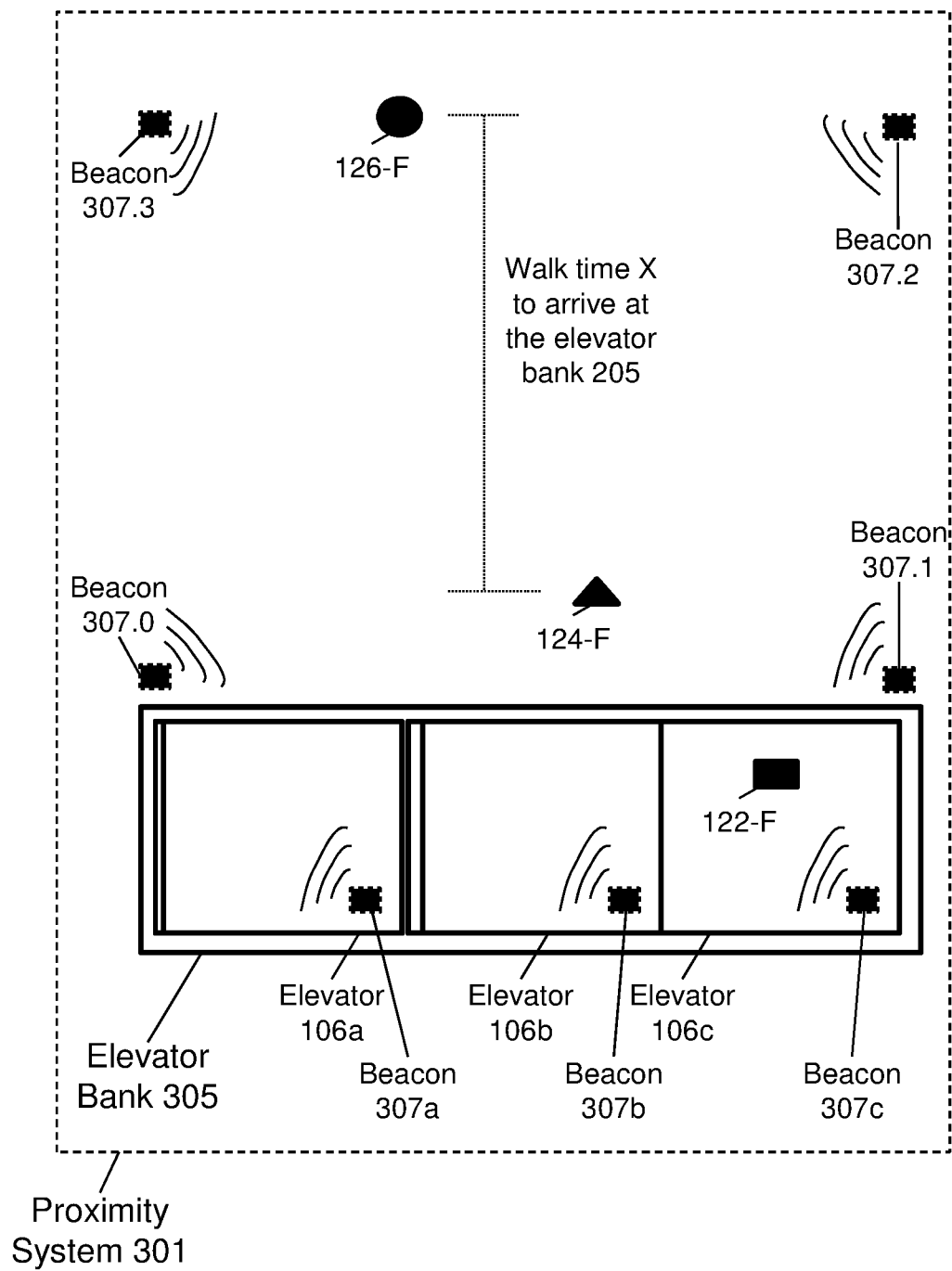
FIG. 3 illustrates an example of another schematic of an intelligent building system according to one embodiment.

FIG. 3 illustrates an example schematic of a proximity system 301 of the intelligent building system 100. The proximity system 301 is only one example of device detection system and is not intended to suggest any limitation as to the scope of use or operability of embodiments of the invention described herein (indeed additional or alternative components and/or implementations may be used). The proximity system 301 includes an elevator bank 305, which comprises of three elevators 106a, 106b, 106c, and a plurality of beacons 307 that detect the F position of each user device 122, 124, 126. Further, the proximity system 301 illustrates that the plurality of beacons 307 are at multiple different positions with respect to the elevator bank 305 as indicated by the numbers 1-4 and the lower case letters a-c. In exemplary embodiments, the beacons use Bluetooth low energy (BLE) technology to detect the presence of a user device and interact with the user devices 122, 124 and 126.

The proximity system 301 can estimate the proximity of the elevator user to the elevator 106 based on the detection of the user device 122. In turn, at some distance (e.g., within fifteen feet), the elevator sub-system 105 can initiate a request to use the elevator 106 on the users behalf, without the need for the elevator user to interact with the user device 122. Further, the intelligent building system 100 can confirm whether the user's walk time X necessitates a delayed elevator call (e.g., user device 126 at position F), the user's walk time necessitates an immediate elevator call since the elevator user has made it to the elevator 106 (e.g., user device 124 at position F), whether the user elevator has boarded the elevator 106 (e.g., user device 122 at position F), etc. In this way, the subset of beacons 307.0-307.3 are utilized to triangulate a location of user devices with respect to the elevator bank 305, while each beacon 307a, 307b, 307c, detects user devices within corresponding elevators 106a, 106b, 106c.

Note that while the proximity system 301 (e.g., the geo-fence environment) can notify the user device of floor changes, as the proximity system 301 is configured to know which floor it is located on, in other embodiments the elevator sub-system 105 notifies the user device of the floor changes directly, since elevator position is very accurately maintained by the elevator sub-system 105.

In operation, for example, the proximity system 205 may also be utilized to augment indoor way-finding. As the user devices 122, 124, 126 detect various beacons 307, a map on the user devices 122, 124, 126 can update in real time. Further, the proximity system 205 may be utilized to detect crowds and/or provide notifications that contain information about the location of the user devices 122, 124, 126, queries with respect to the floor destination, authorization queries (as described below), etc. Further, the notifications can be communicated directly between the intelligent building system 100 and the user devices 122, 124, 126 and/or indirectly through third party networks.

In addition, the proximity system can provide the user's source floor (e.g., via predetermined setting that indicates which floor or in what location of the building 102 the proximity system is installed), while the user device 122 provides a preferred floor and/or other elevator preferences. As noted above, a user's preferred floor and/or other elevator preferences may be stored in elevator subsystem 105 or stored on the user's device 122. The user may be individually identified based on one or more identifiers stored in the user device. In this way, this information (e.g., user position, movements, source floor, destination floor, etc.) is useful to the intelligent building system 100 to reduce the number of nuisance calls and improve elevator performance calls, since an elevator call can be cancelled when the user has not boarded or the user can be registered as a passenger after boarding.

For example, when each of the multiple user devices 122, 124, 126 are detected by the proximity system 301, the elevator sub-system 105 of the intelligent building system 100 can use a dispatch heuristic to accept/process elevator call requests from the user devices 122, 124, 126. The dispatch heuristic is an optimization program utilized by the elevator sub-system 105 to calculate elevator travel times, such that individuals who are traveling to nearby floors are aggregated into groups of and directed to the same elevator to reduce waiting and travel times.

Figure 4:
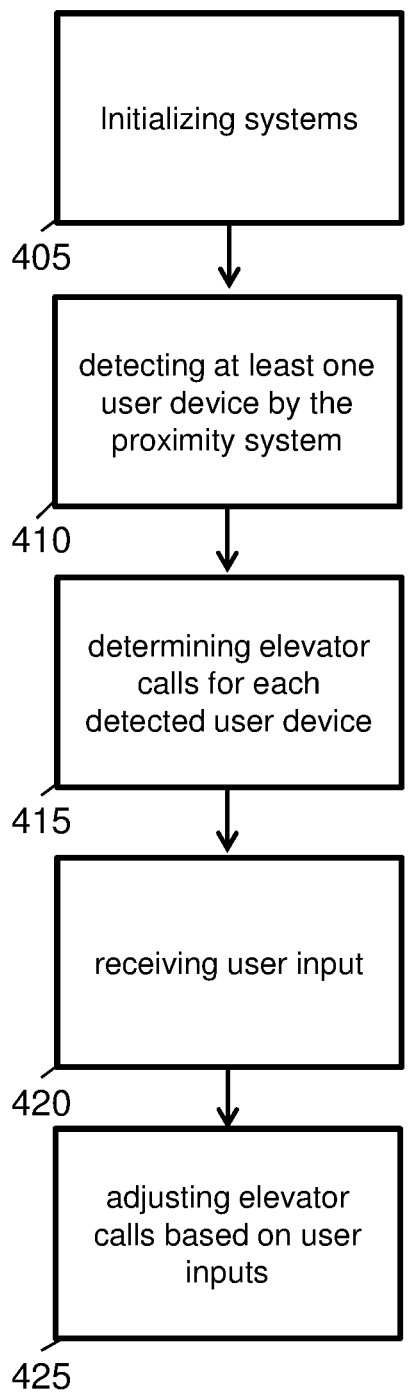
FIG. 4 illustrates a another process flow by an intelligent building system according to one embodiment.

FIG. 4 illustrates a process flow 400 of the intelligent building system 100 that utilizes user positions, movements, source floors, destination floors, etc. in the dispatch heuristic to calculate elevator travel times and dispatch one of the elevators 106a, 106b, 106c. Process flow 400 begins at start block 405 where the proximity system 301 of the intelligent building system 100 is initialized for detecting user devices (e.g., 122, 124, and 126). Also, at block 405, applications localized on the user devices 122, 124, 126 are launched and initialized as a product of these devices being within the geo-fence environment as described above. In turn, the proximity system 301 and the user devices 122, 124, 126 are in communication to facilitate immediate interaction with the elevator sub-system 105 upon arriving at the elevator bank 305.

At block 410, the proximity system 205 detects the user devices 122, 124, 126 at the respective F positions. That is, the proximity system 205 locates the user device 122 on the elevator 106c via beacon 307c; the proximity system 205 triangulates the user device 124 to position F that is in front of the elevator bank 305 via the subset of beacons 307.0-307.3; and the proximity system 205 triangulates the user device 126 to position F that is a walk time X distance from the elevator bank 305 via the subset of beacons 307.0-307.3.

At block 415, the elevator sub-system 105 of the intelligent building system 100 calculates optimal elevator travel times for the user devices 122, 124, 126 in accordance with the respective F positions, source floors, and destination floors. For example, since the user device 122 is on the elevator 106c and the user device 124 is in front of the elevator bank 305 (e.g., prepared to board any elevator of the elevator bank 305), the elevator sub-system 105 can provide elevator 106*c* to the user device 124 if both user devices 122 and 124 have the same destination floor. If both user devices 122 and 124 have different destination floors, the elevator sub-system 105 can provide a different elevator, such as elevator 106*b*, to the user device 124 while continuing to operate elevator 106*c* without interruption for the user device 122. Further, if both user devices 124 and 126 have the same destination floor and if the walk time X is less than or equal to the time it would take to deliver one of the remaining elevators 106*a*, 106*b* to user 124, then the elevator sub-system 105 can provide either elevator 106*a* or elevator 106*b* to both user devices 122 and 124. Otherwise, the elevator sub-system 105 can provide either elevator 106*a* or elevator 106*b* to the user device 124 and the remaining elevator to the user device 126 upon the device arrival at the elevator bank 305 (e.g., based on the walk time X).

Once each elevator 106*a*, 106*b*, 106*c* has been associated with each user device 122, 124, 126, the intelligent building system 100 can communicate these associations with/to the user devices 122, 124, 126. Each user device 122, 124, 126 can in turn prompt a notification indicating that an elevator has been assigned, along with other elevator information (e.g., elevator assignment) that can fed back to the user devices 122, 124, 126 and/or displayed to passengers. In turn, at block 420, a user may interact with the prompt, such as by indicating a confirmation or cancelation of the elevator call. If neither of a confirmation or cancelation is received by the intelligent building system 100, the elevator sub-system 105 may continue to operate and deliver the elevators as determined in block 415. Otherwise, at block 425, the elevator sub-system 105 may recalculate the delivery and path of each elevator 106*a*, 106*b*, 106*c*.

Figure 5:
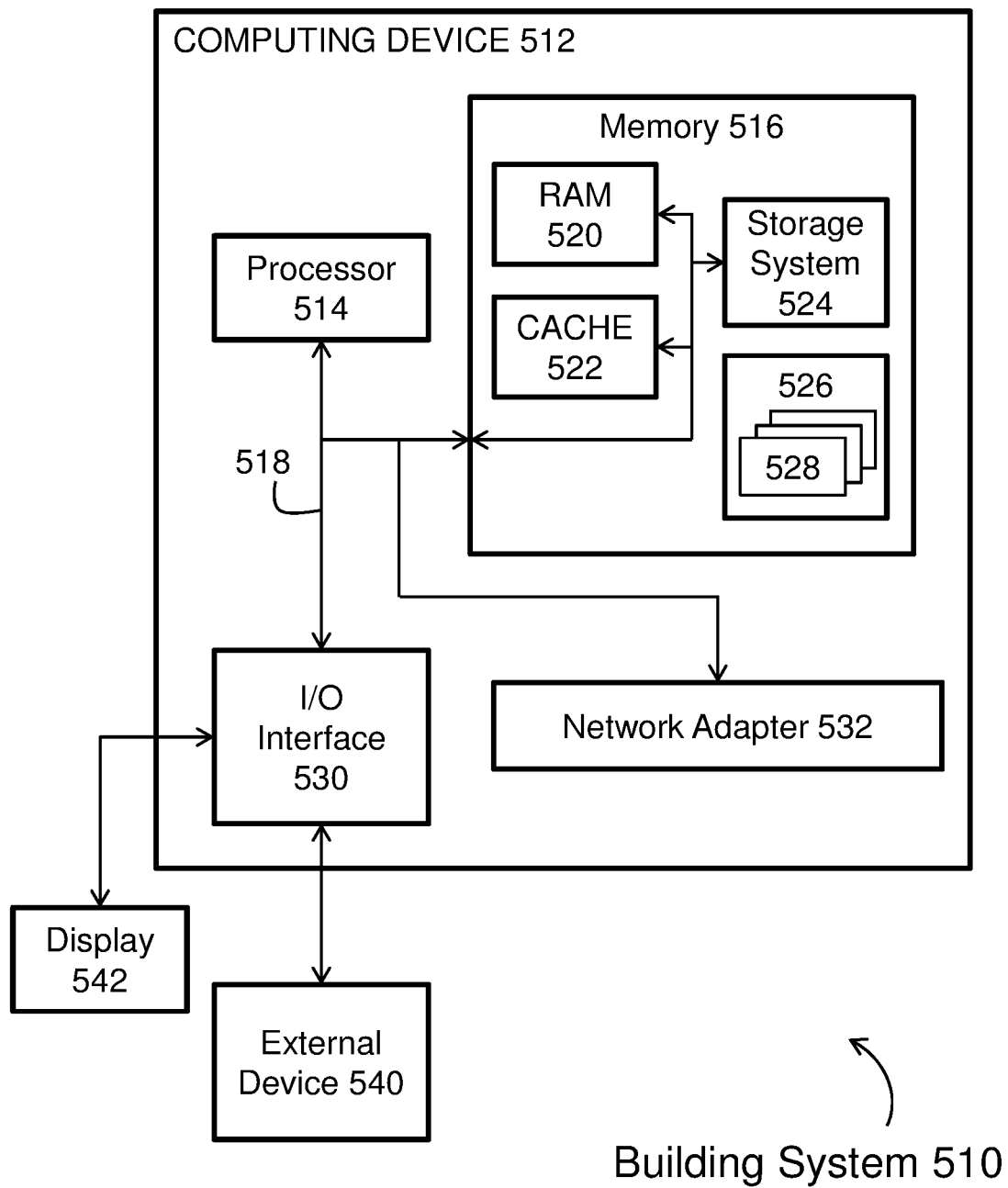
FIG. 5 illustrates a computing device schematic of an intelligent building system according to one embodiment.

Referring now to FIG. 5, an example schematic of a computing device of an intelligent building system is shown. The intelligent building system 510 is only one example of a suitable computing node and is not intended to suggest any limitation as to the scope of use or operability of embodiments of the invention described herein (indeed additional or alternative components and/or implementations may be used). That is, the intelligent building system 510 and elements therein may take many different forms and include multiple and/or alternate components and facilities. Further, the intelligent building system 510 may be any may include and/or employ any number and combination of computing devices and networks utilizing various communication technologies, as described herein. Regardless, the intelligent building system 510 is capable of being implemented and/or performing any of the operability set forth hereinabove.

In the intelligent building system 510 there is a computing device 512, which is operational with numerous other general purpose or special purpose computing system environments or configurations. Systems and/or computing devices, such as the intelligent building system 510 and/or the computing device 512, may employ any of a number of computer operating systems. Examples of computing systems, environments, and/or configurations that may be suitable for use with the computing device 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 512 may be described in the general context of computer system executable instructions, such as program modules, being executed by a computer system. Generally, program modules may include routines, programs, objects, components, logic, data structures, and so on that perform particular tasks or implement particular abstract data types. The computing device 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computing device 512 in the intelligent building system 510 is in the form of a general-purpose computing device that is improved upon by the operation and functionality of the intelligent building system 512, its methods, and/or elements thereof. The components of the computing device 512 may include, but are not limited to, one or more processors or processing units 514, a memory 516, and a bus (or communication channel) 518 which may take the form of a bus, wired or wireless network, or other forms, that couples various system components including to the processor 514 and the system memory 516. The computing device 512 also typically includes a variety of computer system readable media. Such media may be any available media that is accessible by the computing device 512, and it includes both volatile and non-volatile media, removable and non-removable media.

The processor 514 may receive computer readable program instructions from the memory 516 and execute these instructions, thereby performing one or more processes defined by the intelligent building system 510. The processor 514 may include any processing hardware, software, or combination of hardware and software utilized by the computing device 514 that carries out the computer readable program instructions by performing arithmetical, logical, and/or input/output operations. Examples of the processor 514 include, but are not limited to an arithmetic logic unit, which performs arithmetic and logical operations; a control unit, which extracts, decodes, and executes instructions from a memory; and an array unit, which utilizes multiple parallel computing elements.

The memory 516 may include a tangible device that retains and stores computer readable program instructions, as provided by the intelligent building system 510, for use by the processor 514 of the computing device 512. The memory 516 can include computer system readable media in the form of volatile memory, such as random access memory 520, cache memory 522, and/or the storage system 524.

By way of example only, the storage system 524 can be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As will be further depicted and described below, the memory 516 may include at least one program product having a set (e.g., at least one) of program modules that are configured to carry out the operations of embodiments of the invention. The storage system 524 (and/or memory 516) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 524 may generally be included within the computing device 512, as illustrated, employing a computer operating system such as one of those mentioned above, and is accessed via a network in any one or more of a variety of manners.

Program/utility 526, having a set (at least one) of program modules 528, may be stored in memory 516 by way of example, and not limitation, as well as an operating system, one or more application programs, other program modules, and program data. Each of the operating system, one or more application programs, other program modules, and program data or some combination thereof, may include an implementation of a networking environment. Program modules 528 generally carry out the operations and/or methodologies of embodiments of the invention as described herein.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device 512 may also communicate via an input/output (I/O) interface 530 and/or via a network adapter 532. The I/O interface 530 and/or the network adapter 532 may include a physical and/or virtual mechanism utilized by the computing device 512 to communicate between elements internal and/or external to the computing device 512. For example, the I/O interface 530 may communicate with one or more external devices 540, such as a keyboard, a pointing device, a display 540, etc.; one or more devices that enable a user to interact with the computing device 512; and/or any devices (e.g., network card, modem, etc.) that enable the computing device 512 to communicate with one or more other computing devices. Further, the computing device 512 can communicate with one or more networks such as a local area network (LAN), a general wide area network (WAN), and/or a public network (e.g., the Internet) via network adapter 532. Thus, I/O interface 530 and/or the network adapter 532 may be configured to receive or send signals or data within or for the computing device 512. As depicted, the I/O interfaces 530 and the network adapter 532 communicates with the other components of the computing device 512 via the bus 518. It should be understood that although not shown, other hardware and/or software components could be used in conjunction with the computing device 512. Examples, include, but are not limited to: microcode, device drivers, redundant processing units, external disk drive arrays, RAID systems, tape drives, and data archival storage systems, etc.

While single items are illustrated for the intelligent building system 510 (and other items) by FIG. 5, these representations are not intended to be limiting and thus, any items may represent a plurality of items. In general, computing devices may include a processor (e.g., a processor 514 of FIG. 5) and a computer readable storage medium (e.g., a memory 516 of FIG. 5), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the intelligent building system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of building system and method. The intelligent building system, as implemented and/or claimed, improves the functioning of a computer and/or processor itself by enabling a seamless user experience between elevators and system through direct computations of user positions and directions that are further utilized to deliver faster and more convenient elevator access.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   establishing a proximity environment with respect to an elevator;
   detecting a position of a user device within the proximity environment;
   determining, by a processor, a source floor and a destination floor respective to the user device by accessing user preferences that correspond to the user device, the user preferences indicating the destination floor; and
   generating, by the processor, an elevator call to the elevator in accordance with the source floor and the destination floor upon a detection by the proximity system of the user device within a predetermined distance to the elevator, the elevator call being generated without the need for an elevator user to interact with the user device.

2. The method of claim 1, wherein the determining of the source floor and the destination floor, further comprises:
   processing a pre-request received in advance of the user device penetrating the proximity environment.

3. The method of claim 1 wherein the proximity environment is a plurality of virtual perimeters.

4. The method of claim 3, wherein each virtual perimeter is dynamically generated around a predefined set of boundaries with respect to the elevator.

5. The method of claim 1, further comprising:
communicating the elevator call to the user device.

6. The method of claim 1, wherein the generating of the elevator call to the elevator, further comprises:
determining an arrival time for the user device at the elevator in response to motion of the mobile device.

7. A system, comprising a processor and a memory, the processor configured to:
establish a proximity environment with respect to an elevator;
detect a position of a user device within the proximity environment;
determine a source floor and a destination floor respective to the user device by accessing user preferences that correspond to the user device, the user preferences indicating the destination floor; and
generate an elevator call to the elevator in accordance with the source floor and the destination floor upon a detection by the proximity system of the user device within a predetermined distance to the elevator, the elevator call being generated without the need for an elevator user to interact with the user device.

8. The system of claim 7, with respect to the determination of the source floor and the destination floor, the processor is further configured to:
process a pre-request received in advance of the user device penetrating proximity environment.

9. The system of claim 7, wherein the proximity environment is a plurality of virtual perimeters.

10. The system of claim 9, wherein each virtual perimeter is dynamically generated around a predefined set of boundaries with respect to the elevator.

11. The system of claim 7, with respect to the generation of the elevator call to the elevator, the processor is further configured to:
determine an arrival time for the user device at the elevator in response to motion of the mobile device.

12. The method of claim 1, further comprising:
cancelling the elevator call if the user device leaves the proximity environment of an elevator landing before the elevator arrives.

13. A method, comprising:
establishing a proximity environment with respect to an elevator;
detecting a position of a user device within the proximity environment;
determining, by a processor, a source floor and a destination floor respective to the user device; and
generating, by the processor, an elevator call to the elevator in accordance with the source floor and the destination floor upon a detection by the proximity system of the user device within a predetermined distance to the elevator;
wherein the proximity environment comprises a first virtual perimeter and a second virtual perimeter, the second virtual perimeter contained entirely within the first virtual perimeter.

* * * * *